(12) United States Patent
Loffink

(10) Patent No.: US 10,449,852 B2
(45) Date of Patent: Oct. 22, 2019

(54) FUEL CAP AND SEAL ASSEMBLY

(71) Applicant: John A. Loffink, Damascus, OR (US)

(72) Inventor: John A. Loffink, Damascus, OR (US)

( * ) Notice: Subject to any disclaimer, the term of this patent is extended or adjusted under 35 U.S.C. 154(b) by 0 days.

(21) Appl. No.: 14/657,342

(22) Filed: Mar. 13, 2015

(65) Prior Publication Data

US 2016/0263993 A1 Sep. 15, 2016

(51) Int. Cl.
*B60K 15/04* (2006.01)
(52) U.S. Cl.
CPC .. *B60K 15/0406* (2013.01); *B60K 2015/0438* (2013.01); *B60K 2015/0451* (2013.01)
(58) Field of Classification Search
CPC .... B60K 2015/0451; B60K 2015/0438; B60K 15/0406
USPC ............................................. 220/86.1, 86.2
See application file for complete search history.

(56) References Cited

U.S. PATENT DOCUMENTS

| | | | | |
|---|---|---|---|---|
| 2004/0155413 | A1* | 8/2004 | Sato | B60K 15/0406 277/628 |
| 2009/0223970 | A1* | 9/2009 | Keefer | B60K 15/0406 220/378 |
| 2011/0079322 | A1* | 4/2011 | Beier | B60K 15/0406 141/350 |
| 2013/0313790 | A1* | 11/2013 | Isayama | B60K 15/0406 277/637 |

* cited by examiner

*Primary Examiner* — Jeffrey R Allen
(74) *Attorney, Agent, or Firm* — Ingrid McTaggart

(57) ABSTRACT

The present invention provides a fuel cap including a body and a seal positioned on the body, the cap adapted for engaging a filler tube opening, and the seal positioned on the cap body such that the seal sealingly engages an inner diameter surface of a fuel filler neck to seal the cap to the fuel filler neck.

18 Claims, 5 Drawing Sheets

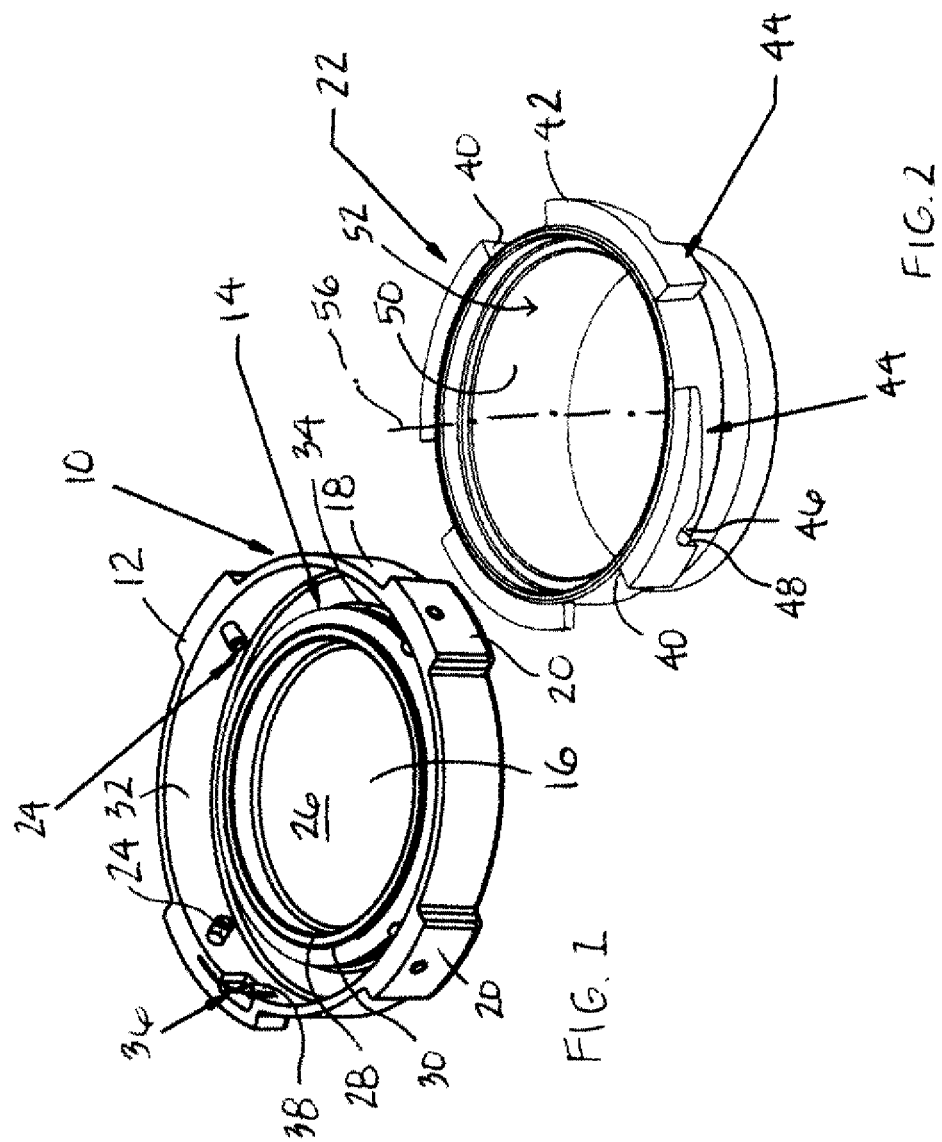

FUEL CAP AND SEAL ASSEMBLY

TECHNICAL FIELD

The present invention relates to a fuel cap and seal assembly, and a process of manufacturing the same, for use in commercial vehicles, and more particularly, to a fuel cap and seal assembly that includes an improved seal that eliminates many components of prior art fuel cap assemblies.

BACKGROUND OF THE INVENTION

Fuel tank caps, also called filler cap assemblies, may be used for sealing the opening of a fuel tank of a vehicle, such as a commercial trucking vehicle. Fuel caps typically are placed on the fuel tank opening and are locked in place to create an airtight seal over the opening. It may be desirable that the airtight seal be maintained during operation of the vehicle so that fuel or fuel vapor is not lost to the atmosphere and so that spillage of the fuel does not occur. Accordingly, it may be desirable that the seal and the locking mechanism be sturdy enough to withstand the harsh environmental conditions of commercial vehicle usage such as extreme weather conditions and continued vibration of the fuel tank and cap during operation of the vehicle. Moreover, it may be desirable that fuel caps maintain an airtight seal over the fuel tank opening during a sudden impact to the fuel tank, such as during a collision, so that fuel is not discharged, which may result in a fire or an explosion.

SUMMARY OF THE INVENTION

The present invention provides a fuel cap including a body and a seal positioned on the body, the cap adapted for engaging a filler tube opening, and the seal positioned on the cap body such that the seal sealingly engages an inner diameter surface of a fuel filler neck to seal the cap to the fuel filler neck.

BRIEF DESCRIPTION OF THE DRAWINGS

FIG. 1 is an isometric bottom view of one example embodiment of a fuel cap.

FIG. 2 is an isometric top view of one example embodiment of a fuel filler neck on which the cap of FIG. 1 may be secured.

DETAILED DESCRIPTION OF THE DRAWINGS

Figure 4:
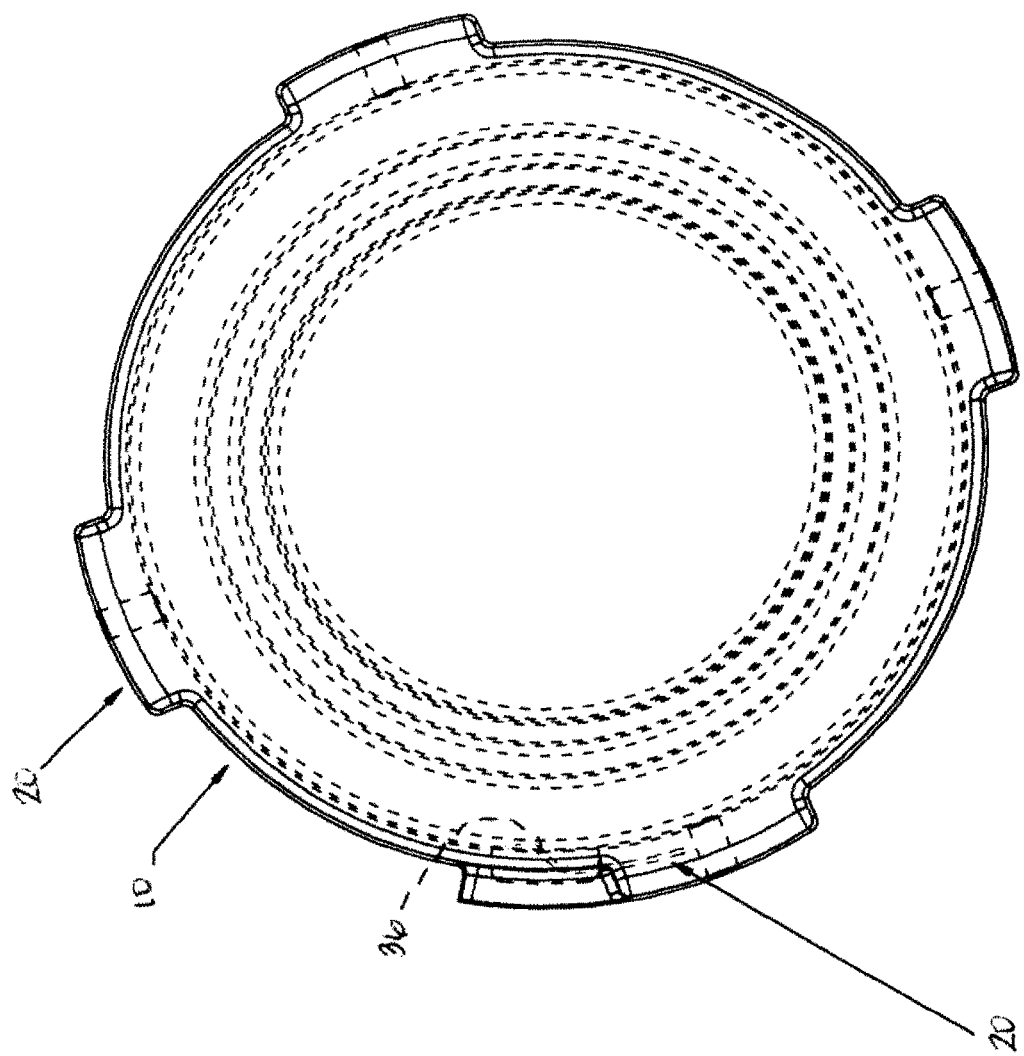
FIG. 4 is a plan view of the cap of FIG. 1.

FIG. 1 is an isometric bottom view of one example embodiment of a fuel cap 10. Cap 10 includes a body 12 and a seal 14 positioned on body 12. Body 12 includes a generally planar expanse 16 with a downwardly extending shoulder 18 (shown extending upwardly in this bottom view drawing) positioned around expanse 16. Shoulder 18 includes several outwardly extending portions 20 that allow a user to easily grip the cap 10 when securing the cap to or removing the cap from a fuel filler neck 22 (FIG. 2). In this embodiment, each of four outwardly extending portions 20 include a cam pin 24 that extends inwardly into an interior 26 of cap 10.

Still referring to FIG. 1, generally planar expanse 16 includes a downwardly extending shoulder 28 that, in this embodiment, is circular in shape. The shoulder 28 defines an outer surface 30 that faces an inner surface 32 of shoulder 18. In the embodiment shown, outer surface 30 and inner surface 32 may be positioned parallel to one another and perpendicular to planar expanse 16. Body 12 of cap 10 may further include a seal seating surface 34 that is positioned on planar expanse 16 and around outer surface 30 of downwardly extending shoulder 28.

In the embodiment shown, seal 14 is an O-ring that is positioned on seating surface 34 and outer surface 30 of shoulder 28. O-ring seal 14 defines a cross sectional shape that is circular, such that seal 14 may "roll" slightly upwardly or downwardly along outer surface 30 of shoulder 28. In another embodiment seal 14 may have an elongate oval cross sectional shape. In still another embodiment seal 14 may comprise a band having a generally rectangular cross sectional shape.

Still referring to FIG. 1, body 12 may further comprise one or more leaf springs 36 secured within one or more of outwardly extending portions 20, and extending inwardly into interior 26 of cap 12. Spring 36 may include a curved portion 38 that is received within an indentation 40 (FIG. 2) of a perimeter 42 of fuel filler neck 22 such that spring 36 acts to retain cap 10 on fuel filler neck 22 when the cap is secured on filler neck 22. Spring 36 may hinder loosening of cap 10 on fuel filler neck 22 due to vibration of the cap 10 during normal operating conditions of a vehicle to which the cap is secured.

FIG. 2 is an isometric top view of one example embodiment of a fuel filler neck 22 on which the cap 10 of FIG. 1 may be secured. Neck 22 includes cam ramps 44 on an outer perimeter 42 of the fuel filler neck 22, the cam ramps defining a downwardly facing surface on fuel filler neck 22. Ramps 44 generally match the number and configuration of cam pins 24 of cap 10 (FIG. 1) such that each of cam ramps 44 are positioned to receive a corresponding one of cam pins 24. Each cam ramp 44 may terminate in a depression 46 and a stop surface 48 that separately or together retain a cam pin 24 there against when the cap 10 is secured on fuel filler neck 22.

Fuel filler neck 22 further includes an inner surface 50, also referred to as an inner diameter surface, that defines an opening 52 for receiving a fuel nozzle during filling of a fuel tank to which fuel filler neck 22 is attached. Inner surface 50 of neck 22 may be sloped, such as defining an angle 54 (FIG. 8) in a range of 0.001 to twenty degrees, and approximately two degrees, with respect to an elongate axis 56 of opening 52. Securing cap 10 on fuel filler neck 22 will now be described.

To secure cap 10 on neck 22, the cap is positioned with cam pins 24 and seal 14 facing towards fuel filler neck 22. The cap 10 is lowered onto neck 22 such that cam pins 24 are positioned within indentations 40 between cam ramps 44. The cap 10 is lowered until seal 14 first engages inner surface 50 of fuel filler neck 22. The cap is then turned in a clock wise direction relative to fuel filler neck 22 such that cam pins 24 engage cam ramps 44 and then begin to move downwardly along cam ramps 44. As cap 10 is turned clock wise on neck 22, and as cam pins 24 move along cam ramps 44, the cap 10 will be pulled downwardly on to fuel filler neck 22, and seal 14 will be pulled into contact with inner surface 50 of fuel filler neck 22. Cap 10 is continually turned on fuel filler neck 22 until cam pins 24 are received within depressions 46 and against stop surfaces 48 of neck 22. In this position, seal 14 will be compressed slightly between inner surface 50 of neck 22 and outer surface 30 of shoulder 28 of cap 10. Stop or seating surface 34 will inhibit the seal from moving upwardly and out of contact with outer surface 30 of the cap and inner surface 50 of the fuel filler neck 22. Accordingly, seal 14 is secured between two surfaces, 30 and 50, that are positioned substantially parallel to elongate axis 56 of fuel filler neck 22, instead of between two surfaces that are position perpendicular to an elongate axis of a fuel filler neck 22. The slight angle 54 of inner surface 50 of neck 22 acts to squeeze seal 14 between surfaces 50 and 30 as the cap 10 is pulled downwardly by cam pins 24 moving along cam ramps 44. In this manner cap 10 is secured to neck 22 and provides a seal between an inner diameter of the neck 22 and the cap 10, instead of on a top surface of neck 22, as in the prior art.

Figure 3:
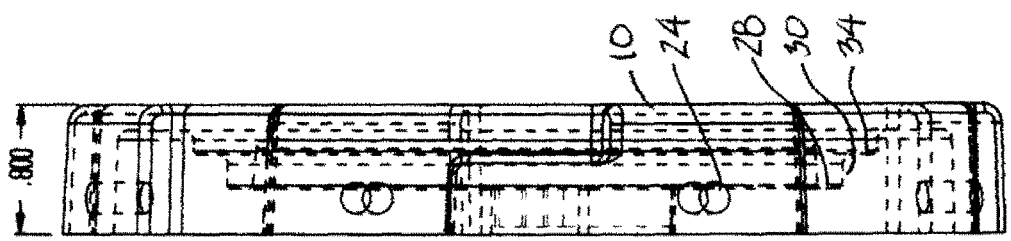
FIG. 3 is a side view of the cap of FIG. 1.

FIG. 3 is a side view of the cap 10 of FIG. 1 showing outer surface 30 and seating surface 34 of shoulder 28.

FIG. 4 is a plan view of the cap 10 of FIG. 1 showing spring 36 and outwardly extending portions 20.

Figure 5:
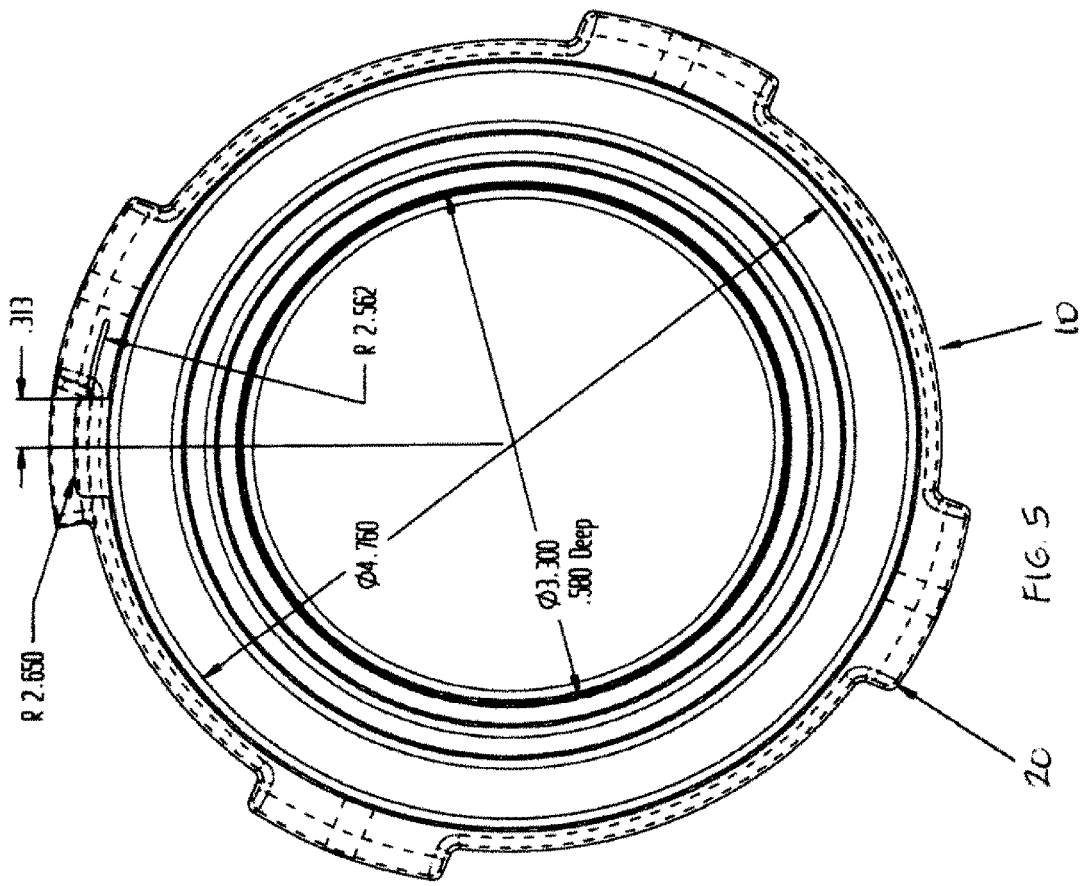
FIG. 5 is a bottom view of the cap of FIG. 1.

FIG. 5 is a bottom view of the cap 10 of FIG. 1.

Figure 6:
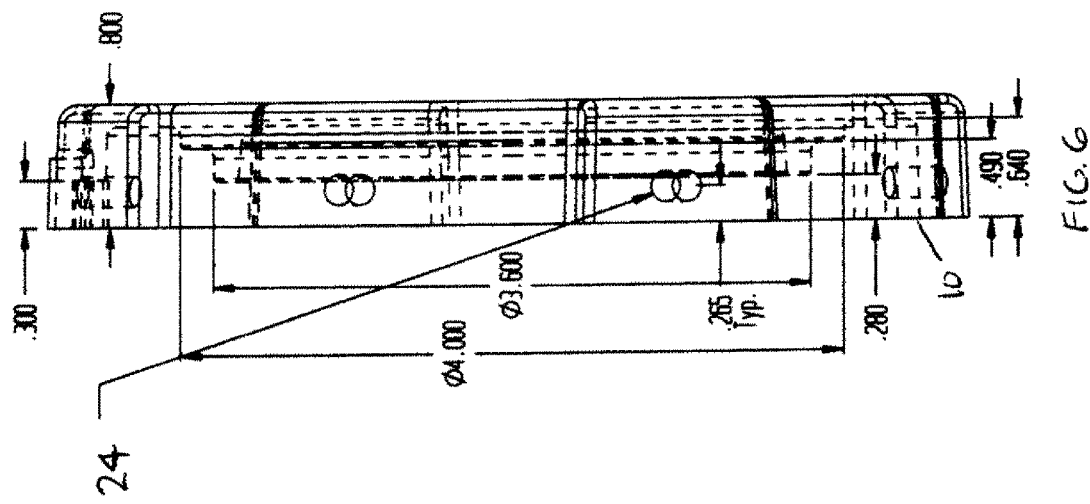
FIG. 6 is a side view of the cap of FIG. 5

FIG. 6 is a side view of the cap 10 of FIG. 5

Figure 7:
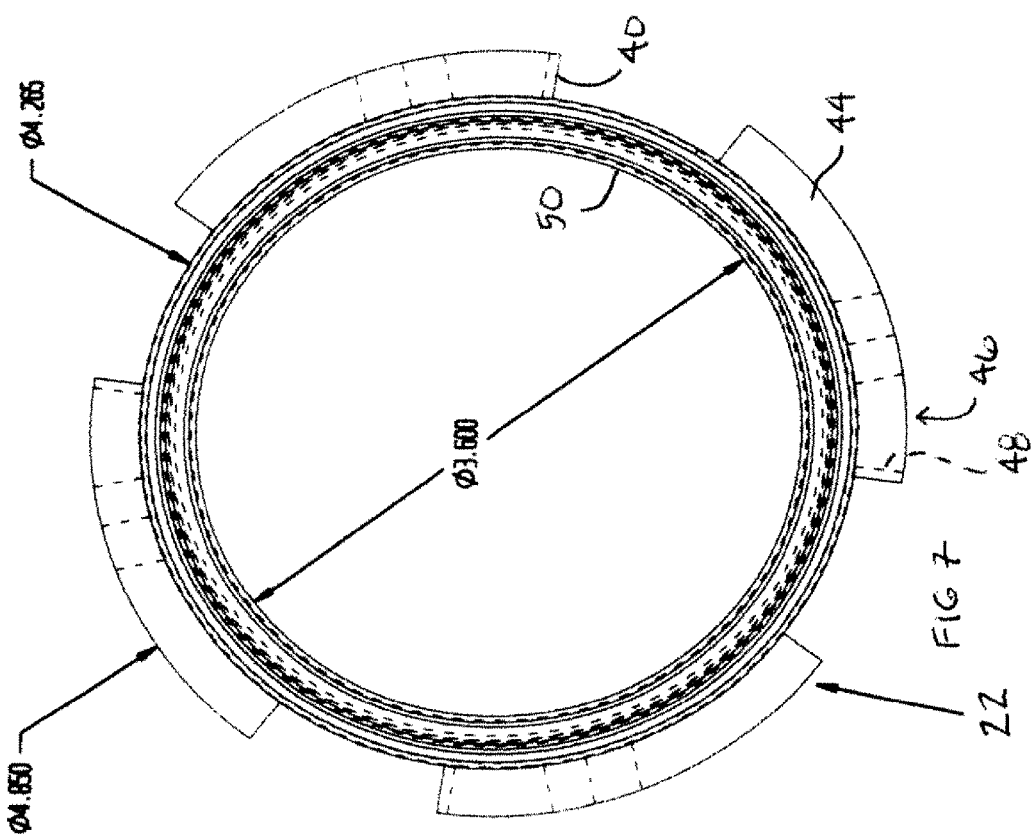
FIG. 7 is plan view of the fuel filler neck of FIG. 2.

FIG. 7 is plan view of the fuel filler neck 22 of FIG. 2.

Figure 8:
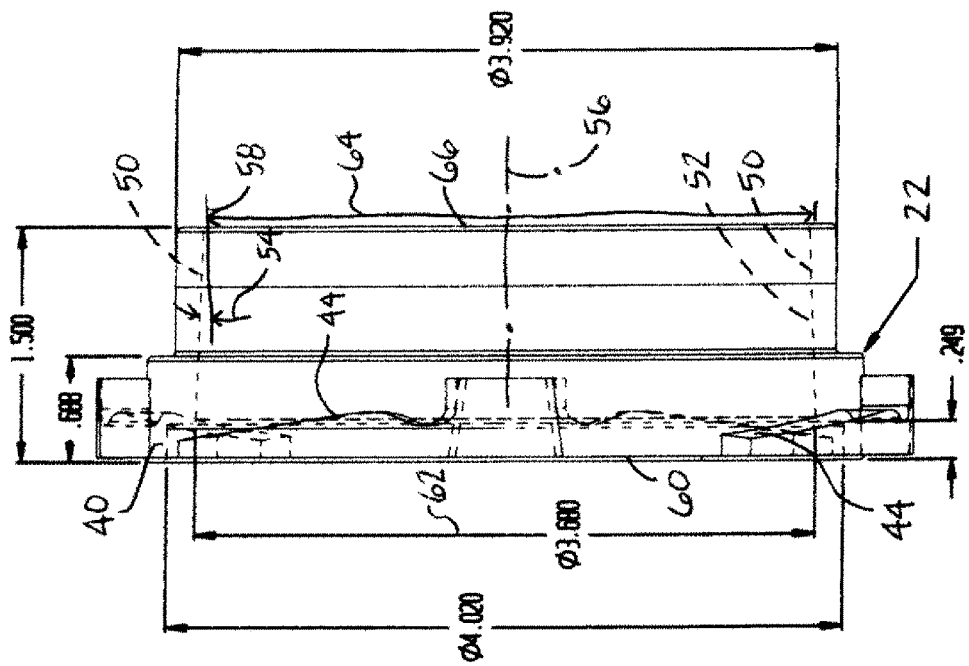
FIG. 8 is a side view of the fuel filler neck of FIG. 7.

FIG. 8 is a side view of the fuel filler neck 22 of FIG. 7 showing cam ramps 44 and indentations 40. In this view, angle 54 is shown as the angle of surface 50 with respect to a line 58 that is parallel to elongate axis 56. Accordingly, inner surface 50 of neck 22 defines an opening 52 of neck 22 that decreases in diameter as the position of the measurement is taken further away from a top surface 60 of neck 22. In other words, a diameter 62 of opening 52 at top surface 60 is larger than a diameter 64 of opening 52 at a bottom surface 66 of neck 22.

Figure 9:
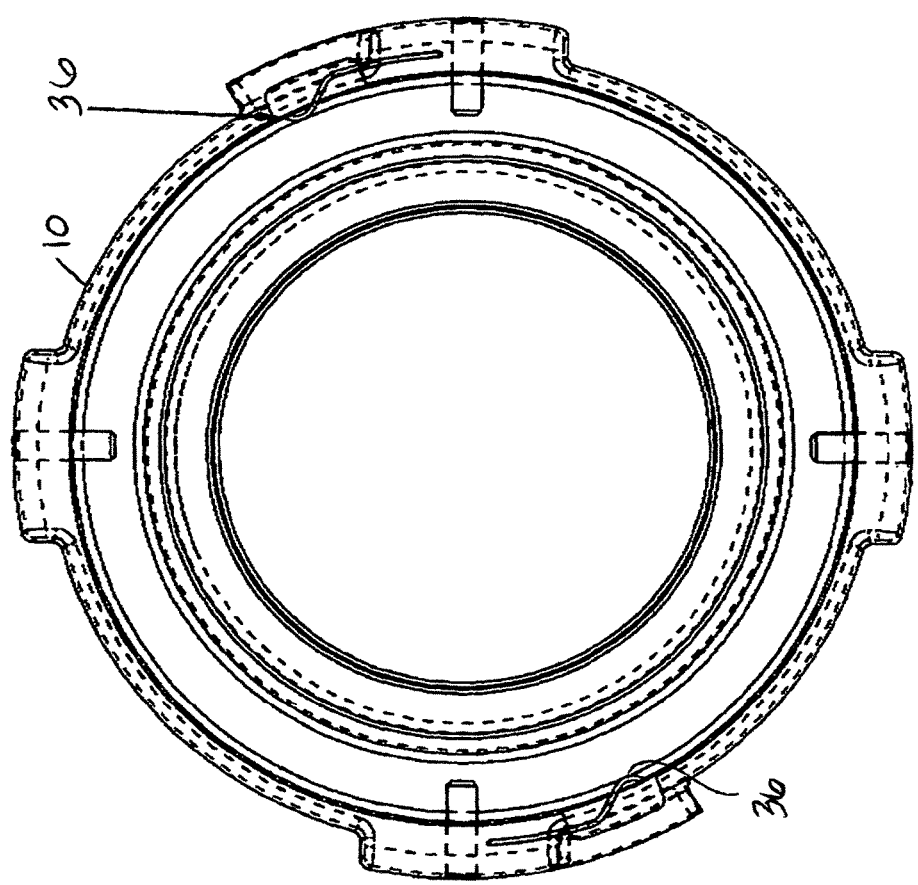
FIG. 9 is a bottom view of another example embodiment of a fuel cap.

FIG. 9 is a bottom view of another example embodiment of a fuel cap 10. In this embodiment, cap 10 includes two springs 36 positioned diametrically opposed to one another across cap 10. The two springs 36 together act to retain cap 10 on a fuel filler neck 22 during use.

Figure 10:
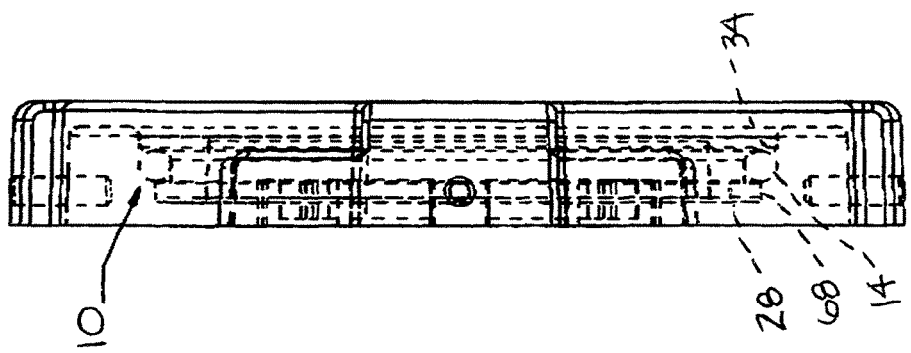
FIG. 10 is a side view of the cap of FIG. 9.

FIG. 10 is a side view of cap 10 of FIG. 9. In this embodiment, shoulder 28 of cap 10 may include a radially extending portion 68 that extends radially outwardly and over seal 14 to retain seal 14 between extending portion 68 and seating surface 34. In this embodiment, radially extending portion 68 extends a distance over seal 14 approximately one half a diameter of seal 14. In other embodiments, portion 68 may extend over seal 14 another distance as may be desired for a particular embodiment. Radially extending portion 68 may hinder seal 14 from being removed from outer surface 30 and cap 10 when the cap is removed from a fuel filler neck 22. In other words, when cap 10 is removed from a fuel filler neck 22, radially extending portion 68 retains seal 14 on cap 10, rather than allowing the seal to remain on neck 22 when the cap 10 is removed from neck 22. However, seal 14 may be manufactured with an elasticity such that an operator may pull seal 14 over portion 68 and off of cap 10 to replace seal 14 with a new seal if the old seal 14 becomes worn or damaged. In this manner, cap 10 may be repaired in a short time period and with a relatively low cost when compared with prior art cap 10 assemblies.

A benefit of the present invention is that cap 10, with seal 14 positioned thereon, may be secured on existing cam design fuel filler necks 22. Accordingly, the improved sealing method and apparatus of the present invention, wherein the cap 10 seals a fuel filler neck 22 on an inner surface or diameter of the neck 22, may be secured on an existing fuel filler neck 22 without changing out the existing neck 22 of the fuel tank. Moreover, the cap 10 of the present invention may utilize less materials to manufacture, and may utilize a seal having a much more simple and elegant design, when compared to seals and cap designs of the prior art. Accordingly, replacement of seal 14 of cap 10 may be easy and inexpensive when compared to seal replacement requirements of prior art fuel filler caps.

In the above description numerous details have been set forth in order to provide a more through understanding of the present invention. It will be obvious, however, to one skilled in the art that the present invention may be practiced using other equivalent designs.

I claim:

1. A fuel tank cap comprising:
   a body that defines a top expanse;
   a first shoulder extending downwardly from said top expanse, said first shoulder defining an inwardly facing surface;
   a second shoulder extending downwardly from said top expanse and positioned interior of said first shoulder, said second shoulder defining an outwardly facing surface that faces said inwardly facing surface of said first shoulder, said outwardly facing surface defining a length measured along an elongate axis of said body, wherein said first and second shoulders and said body comprise a single structure;
   a seal rollably positioned on said outwardly facing surface of said second shoulder, said seal having a width measured along said elongate axis that is less than said length of said outwardly facing surface such that said seal rolls along said length of said outwardly facing surface in one of an upward direction and a downward direction along said elongate axis in response to contact of said seal with an interior surface of a fuel filler neck;
   wherein said outwardly facing surface is fixedly positioned perpendicular to said top expanse when said seals rolls along said length of said outwardly facing surface; and
   wherein said cap includes a leaf spring, said leaf spring including a first edge, a second edge, a spring length extending there between, a spring thickness, and a spring width greater than said spring thickness, wherein an entirety of said spring width is positioned perpendicular to said spring length and said entirety of said spring width is positioned perpendicular to said top expanse completely along said length of said leaf spring, said first edge secured within said first shoulder and said second edge being unsecured to said first shoulder and extending inwardly toward said second shoulder, wherein said width of said leaf spring at said unsecured second edge of said leaf spring moves along an arc positioned in a plane parallel to said top expanse of said cap during rotational movement of said cap on a fuel filler neck such that said width of said unsecured second edge remains perpendicular to said top expanse and parallel to said elongate axis during said movement of said unsecured second edge of said leaf spring, said spring retaining said cap body in a secured position on a fuel filler neck.

2. A cap according to claim 1 wherein said elongate axis extends perpendicular to said top expanse, and wherein said inwardly facing surface of said first shoulder and said outwardly facing surface of said second shoulder are each positioned parallel to said elongate axis.

3. A cap according to claim 1 wherein said first shoulder is positioned around a perimeter of said top expanse.

4. A cap according to claim 1 wherein said first shoulder and said second shoulder each define a circular footprint on said top expanse.

5. A cap according to claim 4 wherein said first shoulder and said second shoulder define concentric circles.

6. A cap according to claim 1 wherein said seal defines an O-ring having a circular cross sectional shape.

7. A cap according to claim 1 wherein said second shoulder defines a seating surface for supporting said seal, said seating surface positioned parallel to said top expanse.

8. A cap according to claim 1 wherein said second shoulder defines a retaining surface positioned at a distal end of said length of said outwardly facing surface from said expanse, said retaining surface retaining said seal on said outwardly facing surface.

9. A fuel tank cap assembly comprising:
a cap body that defines a top expanse having an outer edge and an elongate axis positioned perpendicular to said top expanse;
a shoulder extending downwardly from said top expanse and positioned interior from said outer edge of said body, said shoulder defining a radially outwardly facing surface having a length and being positioned perpendicular to said top expanse, wherein said shoulder and said cap body define one integral structure; and
a seal rollably positioned on said radially outwardly facing surface of said shoulder, said seal having a diameter less than said length such that said seal rolls in one of an upward direction and a downward direction along said length of said outwardly facing surface of said shoulder when said cap is secured on an interior surface of a fuel filler neck;
wherein said outwardly facing surface remains positioned perpendicular to said top expanse when said seals rolls along said length of said outwardly facing surface; and
wherein said cap includes a leaf spring, said leaf spring including a first edge, a second edge, a spring length extending there between, a spring thickness, and a spring width greater than said spring thickness, wherein an entirety of said spring width is positioned perpendicular to said spring length and said entirety of said spring width is positioned perpendicular to said top expanse completely along said length of said leaf spring, said first edge of said leaf spring secured within said cap body adjacent said outer edge of said cap body and said second edge of said leaf spring being unsecured to said cap body and extending inwardly toward said shoulder, wherein said width of said leaf spring at said unsecured second edge of said leaf spring moves along an arc positioned in a plane parallel to said top expanse of said cap during rotational movement of said cap on a fuel filler neck such that said width of said unsecured second edge remains perpendicular to said top expanse and parallel to said elongate axis during said movement of said unsecured second edge of said leaf spring, said spring retaining said cap body in a secured position on a fuel filler neck.

10. An assembly according to claim 9 wherein said radially outwardly facing surface of said shoulder is positioned parallel to said elongate axis.

11. An assembly according to claim 9 wherein said body further includes a second shoulder positioned at said outer edge of said top expanse and wherein said leaf spring is secured within said second shoulder.

12. An assembly according to claim 11 wherein said shoulder and said second shoulder each define a circular footprint on said top expanse.

13. An assembly according to claim 9 wherein said shoulder defines a seating surface and a retaining surface positioned on opposite ends of said length of said shoulder for securing said seal on said shoulder.

14. An assembly according to claim 9 further comprising:
a fuel filler neck including an interior surface that defines a fuel receiving aperture, said interior surface facing radially inwardly and sealingly engaging said seal when said cap body is secured on said fuel filler neck, wherein said seal rolls along said interior surface of said fuel filler neck as said cap body is secured on said fuel filler neck.

15. A fuel cap assembly comprising:
a fuel filler neck including a radially inwardly facing surface and an elongate axis;
a cap body including a radially outwardly facing surface that defines a length; and
a seal positioned on said radially outwardly facing surface, said seal having a diameter less than said length;
wherein said seal sealingly and rollingly engages said inwardly facing surface of said fuel filler neck by rolling in at least one of an upward direction and a downward direction along said length of said radially outwardly facing surface of said cap when said seal of said cap body is secured on said inwardly facing surface of said fuel filler neck;
wherein said outwardly facing surface is positioned perpendicular to a top expanse of said cap body when said seals rolls along said length of said outwardly facing surface, and wherein said top expanse and said outwardly facing surface comprise a single structure; and
wherein said cap body includes a leaf spring, said leaf spring including a first edge, a second edge, a spring length extending there between, a spring thickness, and a spring width greater than said spring thickness, wherein an entirety of said spring width is positioned perpendicular to said spring length and said entirety of said spring width is positioned perpendicular to a top expanse of said cap body completely along said length of said leaf spring, said first edge of said leaf spring secured within said cap body outwardly of said outwardly facing surface of said cap body and said second edge of said leaf spring being unsecured to said cap body and extending inwardly toward said outwardly facing surface, wherein said width of said leaf spring at said unsecured second edge of said leaf spring moves along an arc positioned in a plane parallel to said top expanse of said cap body during rotational movement of said cap body on said fuel filler neck such that said width of said unsecured second edge remains perpendicular to said top expanse and parallel to said elongate axis during said movement of said unsecured second edge of said leaf spring, said spring retaining said cap body in a secured position on said fuel filler neck.

16. An assembly according to claim 15 wherein said radially outwardly facing surface is positioned parallel to said elongate axis when said cap body is secured on said fuel filler neck, said radially inwardly facing surface of said fuel filler neck is positioned at an angle in a range of 0.001 to five degrees with respect to said elongate axis, and wherein said seal sealingly and rollingly engages said radially outwardly facing surface when said cap body is secured on said fuel filler neck.

17. An assembly according to claim 15 wherein said cap body includes a radially inwardly facing surface positioned within a range of 0.001 to five degrees with respect to said elongate axis and outwardly of said radially outwardly facing surface, said leaf spring secured in said inwardly facing surface, said fuel filler neck including a perimeter that extends radially around said fuel filler neck and includes an indentation, said spring received within said indentation when said cap body is in a secured position on said fuel filler neck such that said spring retains said cap body on said fuel filler neck when said cap body is in a secured position on said fuel filler neck, and wherein said unsecured end region of said spring pivots in a plane parallel to said top expanse of said cap, about a pivot axis positioned perpendicular to said top expanse, during rotational movement of said cap on a fuel filler neck.

18. A fuel tank cap according to claim 1 further comprising a fuel filler neck having an interior surface positioned parallel to said outwardly facing surface of said second shoulder when said cap body is secured on said fuel filler neck, wherein said seal rolls in one of said upward direction and said downward direction along said interior surface of said fuel filler neck and simultaneously rolls in one of said upward direction and said downward direction along said length of said rigid outwardly facing surface of said second shoulder when said cap body is secured on said fuel filler neck.

* * * * *